(12) United States Patent
Siegmund

(10) Patent No.: US 10,124,447 B2
(45) Date of Patent: Nov. 13, 2018

(54) RAIL, CONNECTING FRAME, AND CASTER OF A RAIL SYSTEM FOR WELDING TABLES

(71) Applicant: Bernd Siegmund, Grossaitingen (DE)

(72) Inventor: Bernd Siegmund, Grossaitingen (DE)

( * ) Notice: Subject to any disclaimer, the term of this patent is extended or adjusted under 35 U.S.C. 154(b) by 167 days.

(21) Appl. No.: 14/914,811

(22) PCT Filed: Jul. 12, 2014

(86) PCT No.: PCT/EP2014/001918
§ 371 (c)(1),
(2) Date: Feb. 26, 2016

(87) PCT Pub. No.: WO2015/028109
PCT Pub. Date: Mar. 5, 2015

(65) Prior Publication Data
US 2016/0207151 A1 Jul. 21, 2016

(30) Foreign Application Priority Data
Aug. 28, 2013 (DE) .................... 20 2013 007 619 U

(51) Int. Cl.
*F16C 17/00* (2006.01)
*F16C 29/00* (2006.01)
(Continued)

(52) U.S. Cl.
CPC ........ *B23K 37/0461* (2013.01); *A47B 91/002* (2013.01); *A47B 91/08* (2013.01); *B25H 1/02* (2013.01)

(58) Field of Classification Search
USPC ....... 248/646, 660, 661, 662, 663, 673, 424, 248/429, 430; 384/7, 48, 49, 50, 55
See application file for complete search history.

(56) References Cited

U.S. PATENT DOCUMENTS 4,593,957 A * 6/1986 Hidano .................. F16C 33/64
384/49
4,655,466 A 4/1987 Hanaoka
(Continued)

FOREIGN PATENT DOCUMENTS

CN 1241234 A 1/2000
CN 101476267 A 7/2009
(Continued)

OTHER PUBLICATIONS

Chinese Search Report dated Nov. 28, 2016 by the Chinese Patent Office in Chinese Patent Application No. 201480046068.1.
(Continued)

*Primary Examiner* — Terrell L McKinnon
*Assistant Examiner* — Michael McDuffie
(74) *Attorney, Agent, or Firm* — Henry M. Feiereisen LLC

(57) ABSTRACT

Disclosed is a rail system for welding tables, including a base rail which is designed to be secured on or in a floor and has multiple openings corresponding to the openings of the welding tables; a connecting frame of a rail system for welding tables, said connecting frame being provided with rollers which are designed to interact with a circular rail; and a caster of a rail system for welding tables, said caster comprising a main part, rollers, and a tilting protection device. The is configured in that a circular rail is secured in a recess of the base rail. The connecting frame is configured in that a recess is provided in each base plate of the connecting frame, a rotating assembly roller being securable in the recess in different rotational positions. The caster is configured in that the rollers are designed to interact with a circular rail and the tilting protection device is designed to interact with a tilting protection recess and a tilting protection edge of a rail.

9 Claims, 16 Drawing Sheets

(51) Int. Cl.
*F16C 31/00* (2006.01)
*B23K 37/04* (2006.01)
*B25H 1/02* (2006.01)
*A47B 91/00* (2006.01)
*A47B 91/08* (2006.01)

(56) References Cited

U.S. PATENT DOCUMENTS

| | | | |
|---|---|---|---|
| 4,775,247 A | 10/1988 | Isert | |
| 4,867,427 A | 9/1989 | Cunningham | |
| 4,919,384 A * | 4/1990 | Grimberg | B23Q 9/0014 |
| | | | 248/646 |
| 5,280,987 A * | 1/1994 | Miller | B60N 2/01583 |
| | | | 248/429 |
| 5,290,106 A * | 3/1994 | Ichida | F16C 29/008 |
| | | | 384/45 |
| 5,318,284 A | 7/1994 | Demmeler | |
| 5,582,381 A * | 12/1996 | Graf | B60N 2/071 |
| | | | 248/430 |
| 5,653,172 A | 8/1997 | Roschier | |
| 5,772,173 A * | 6/1998 | Couasnon | B60N 2/0705 |
| | | | 248/430 |
| 5,839,721 A | 11/1998 | Kobayashi | |
| 6,012,848 A * | 1/2000 | Michioka | F16C 29/0602 |
| | | | 384/43 |
| 6,105,920 A * | 8/2000 | Gauger | B60N 2/067 |
| | | | 248/429 |
| 6,155,716 A * | 12/2000 | Okamura | B23Q 1/017 |
| | | | 384/48 |
| 6,422,526 B1 * | 7/2002 | Ishikawa | B60N 2/071 |
| | | | 248/430 |
| 6,427,962 B1 * | 8/2002 | Rohee | B60N 2/0705 |
| | | | 248/424 |
| 6,435,421 B1 | 8/2002 | Peterson | |
| 7,780,138 B1 * | 8/2010 | Lee | B60N 2/0705 |
| | | | 248/429 |
| 8,132,772 B1 * | 3/2012 | Thomas | F16C 29/004 |
| | | | 248/429 |
| 8,646,742 B2 * | 2/2014 | Hayashi | B60N 2/0707 |
| | | | 248/419 |
| 2004/0232299 A1 * | 11/2004 | Kato | F16C 29/0657 |
| | | | 248/298.1 |
| 2008/0253703 A1 * | 10/2008 | Michioka | F16C 29/005 |
| | | | 384/49 |
| 2009/0268993 A1 | 10/2009 | Tsai | |
| 2010/0177994 A1 * | 7/2010 | Rudy | F16C 29/025 |
| | | | 384/7 |
| 2010/0239192 A1 * | 9/2010 | Schroeder | F16C 29/005 |
| | | | 384/7 |
| 2011/0233371 A1 * | 9/2011 | Kitamura | B60N 2/07 |
| | | | 248/430 |
| 2012/0163741 A1 * | 6/2012 | Lee | F16C 29/041 |
| | | | 384/51 |
| 2013/0294713 A1 * | 11/2013 | Hsu | F16C 29/0642 |
| | | | 384/7 |
| 2015/0144765 A1 * | 5/2015 | Yang | B65H 1/00 |
| | | | 248/646 |

FOREIGN PATENT DOCUMENTS

| | | |
|---|---|---|
| CN | 201685045 U | 12/2010 |
| CN | 202 193 546 U | 4/2012 |
| CN | 102489907 A | 6/2012 |
| CN | 103084772 A | 5/2013 |
| DE | 417991 | 8/1925 |
| DE | 1193888 | 5/1965 |
| DE | 3842627 A1 | 6/1990 |
| DE | 90 15 218 | 4/1991 |
| DE | 91 09 540.9 U1 | 10/1991 |
| DE | 4318383 C1 | 7/1994 |
| DE | 44 04 109 A1 | 10/1994 |
| DE | 44 28 558 A1 | 2/1996 |
| DE | 19917209 A1 | 2/2000 |
| DE | 198 46 161 A1 | 4/2000 |
| DE | 100 11 490 A1 | 9/2001 |
| DE | 202 04 107 U1 | 8/2002 |
| DE | 202 12 731 U1 | 12/2002 |
| DE | 20219317 U1 | 3/2003 |
| DE | 200 230 552 U1 | 11/2004 |
| DE | 2009 022 013 A1 | 11/2010 |
| EP | 0371318 A1 | 6/1990 |
| EP | 0541 904 A1 | 5/1993 |
| JP | H 3254388 A | 11/1991 |
| JP | H07-54843 | 2/1995 |
| RU | 2423222 C1 | 7/2011 |
| RU | 2481935 C2 | 5/2013 |

OTHER PUBLICATIONS

English translation of Chinese Search Report dated Nov. 28, 2016 by the Chinese Patent Office in Chinese Patent Application No. 201480046068.1.
International Search Report issued by the European Patent Office in International Application PCT/EP2014/001918.
Russian Search Report dated Mar. 15, 2018 with respect to counterpart Russian patent application 2016110789/02.
Translation of Russian Search Report dated Mar. 15, 2018 with respect to counterpart Russian patent application 2016110789/02.

* cited by examiner

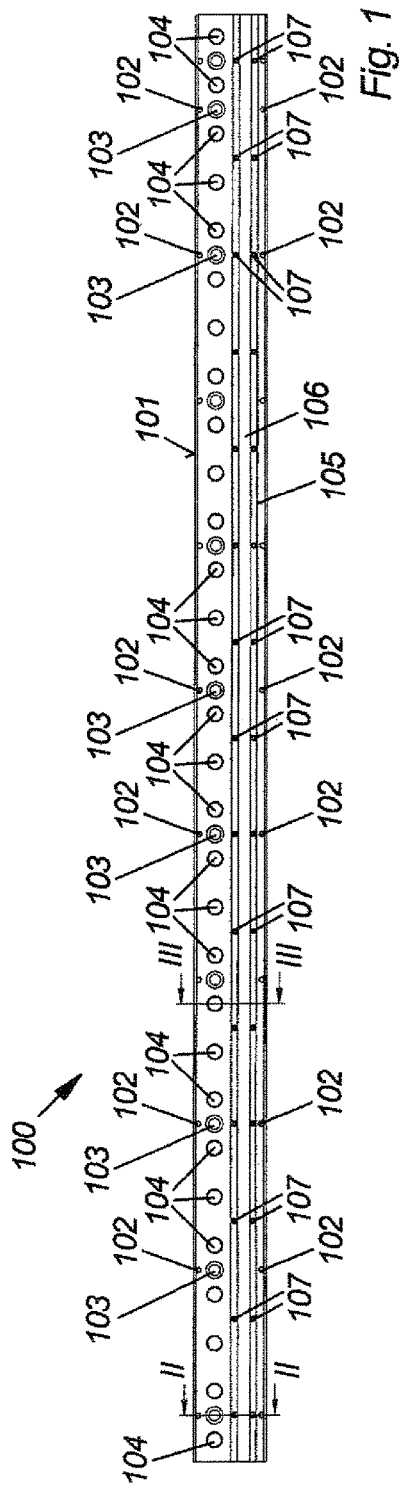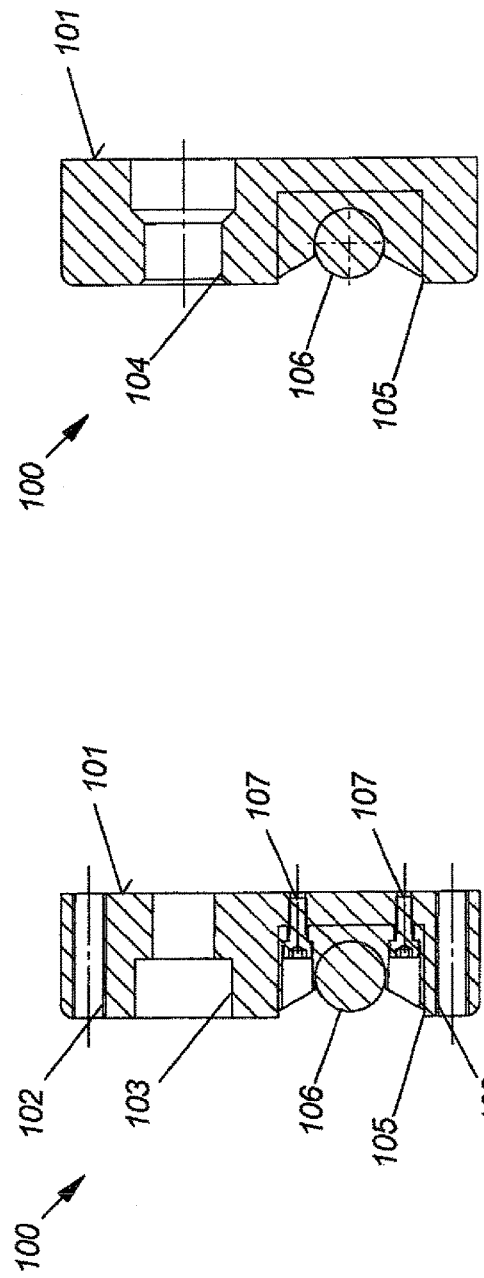

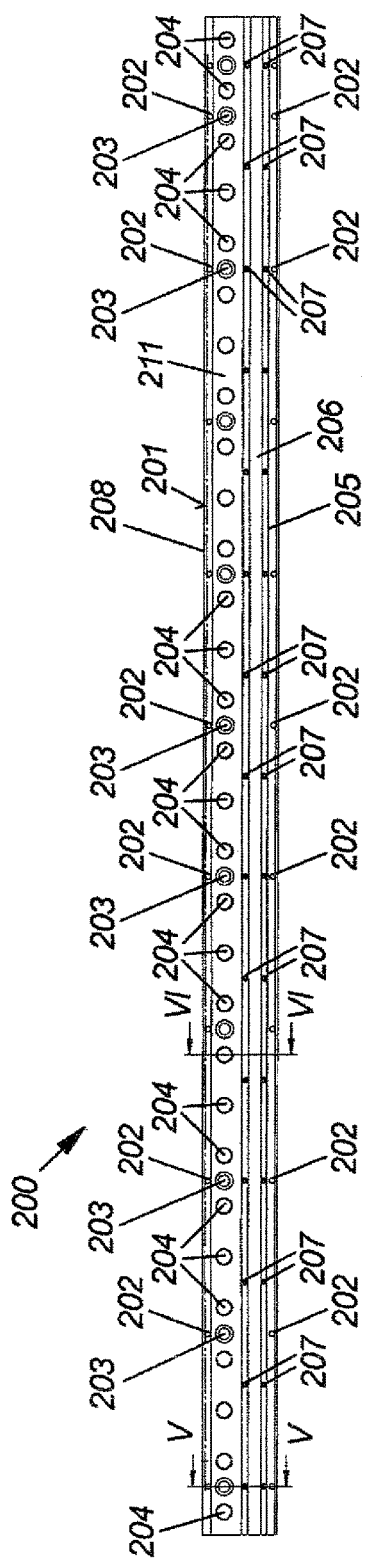
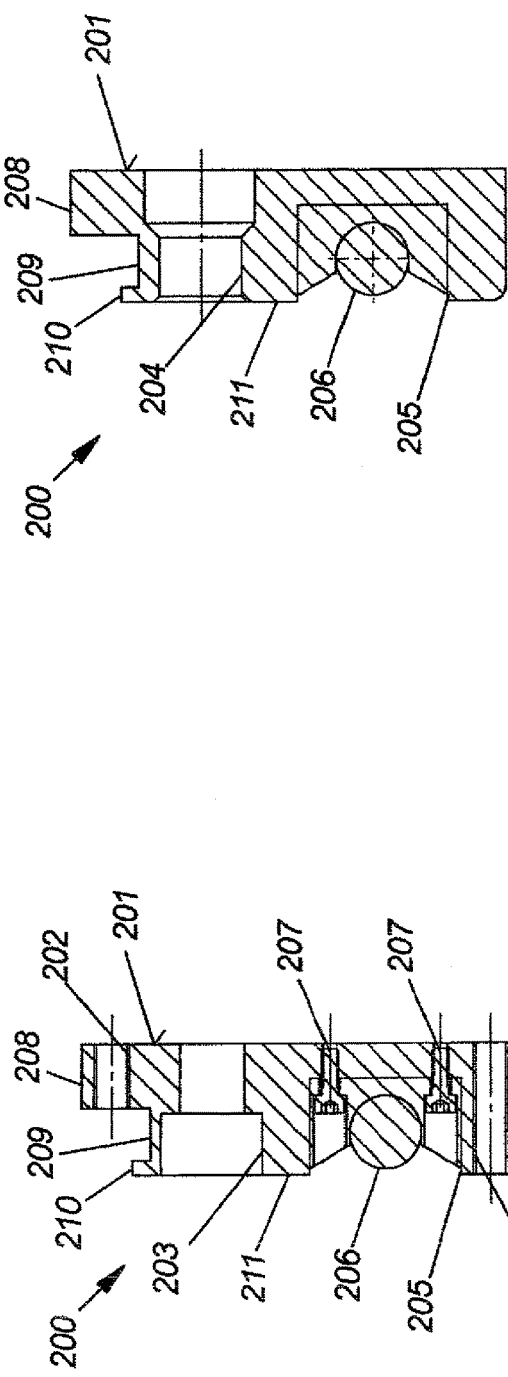
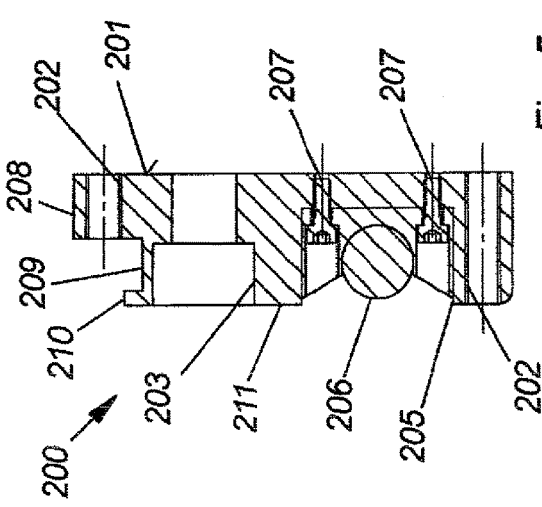
Fig. 4
Fig. 5
Fig. 6

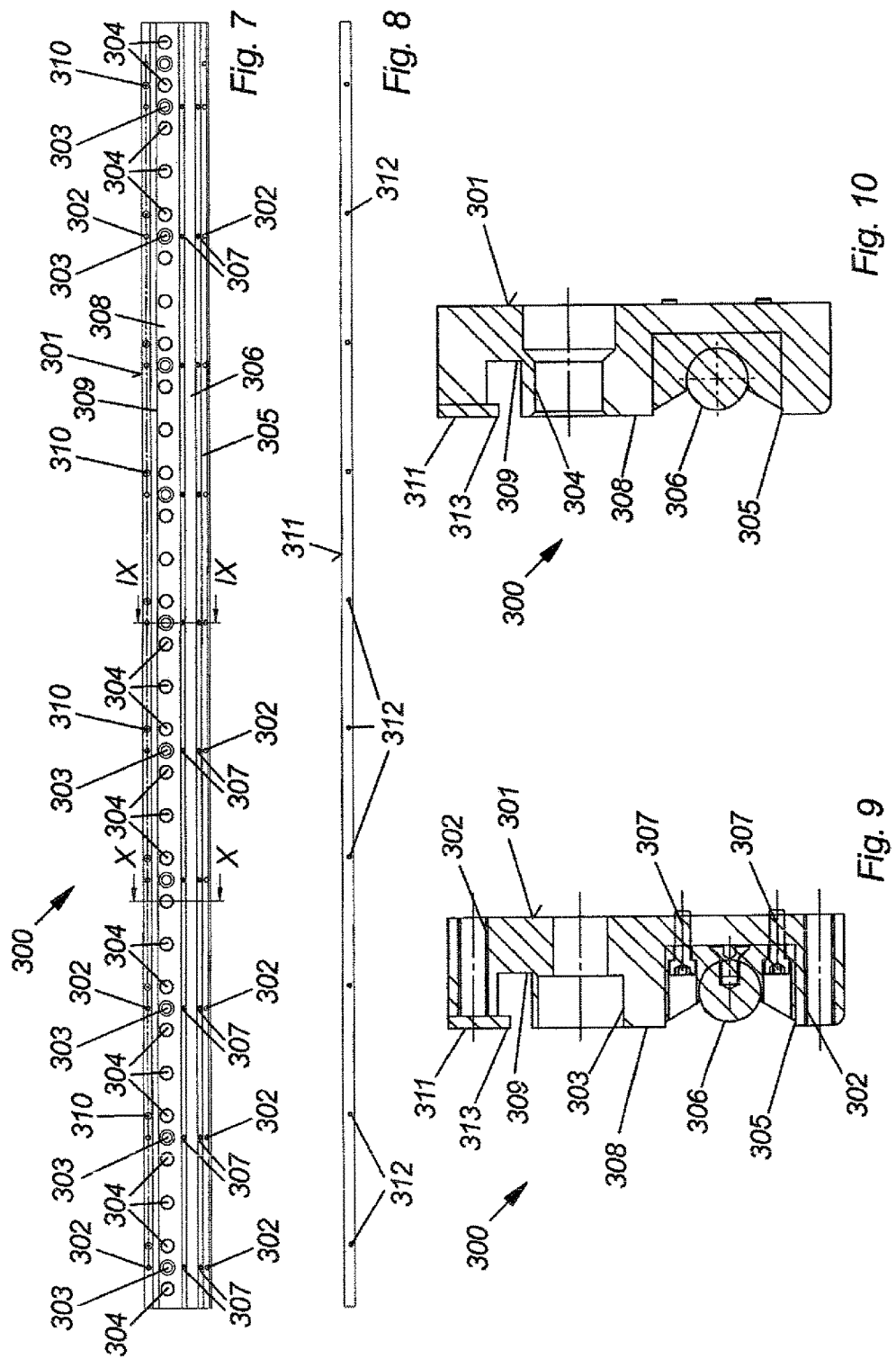

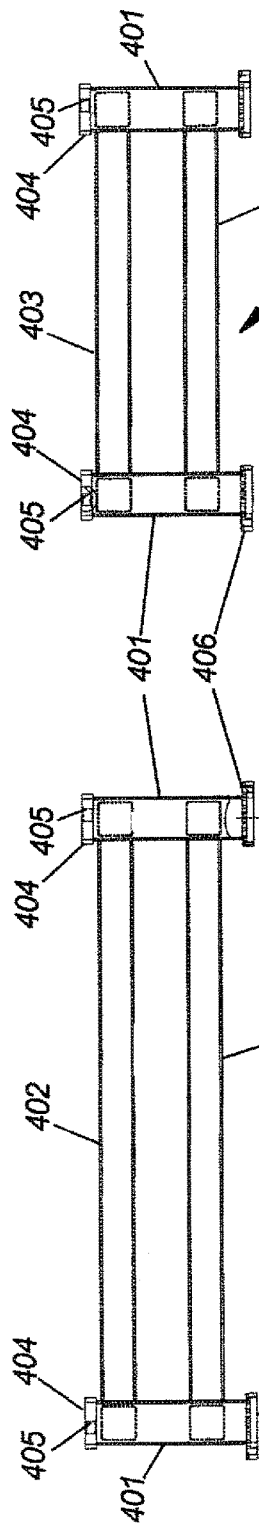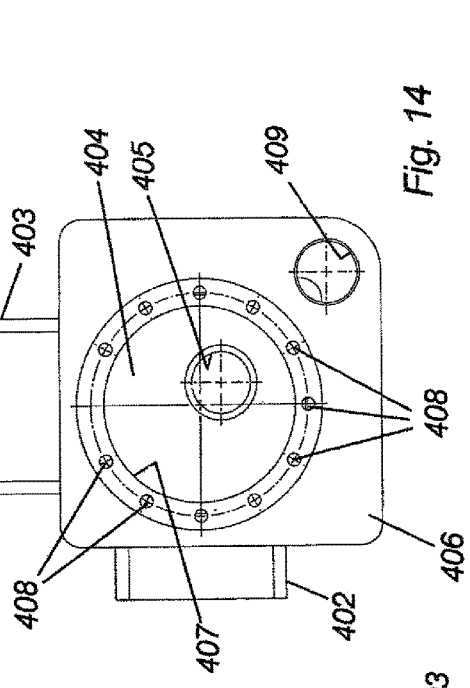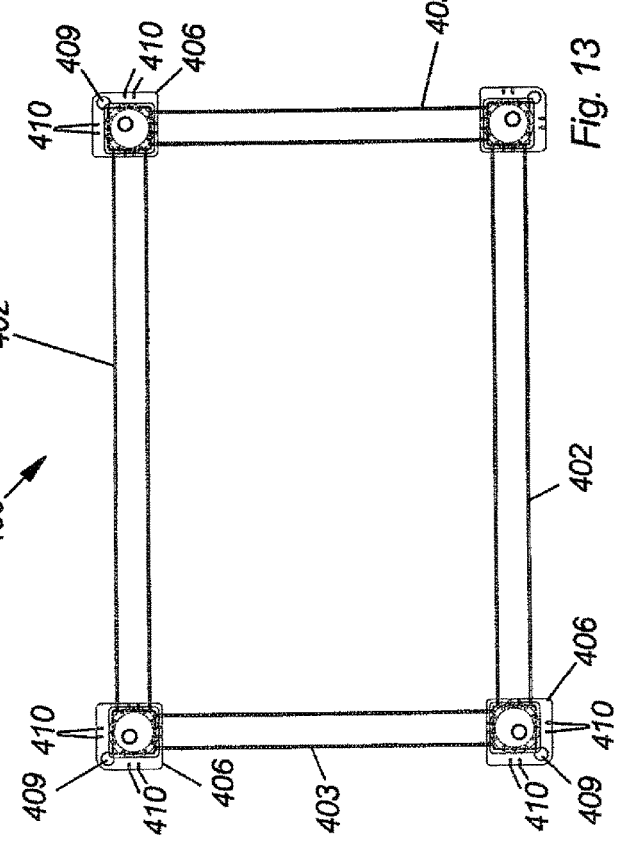

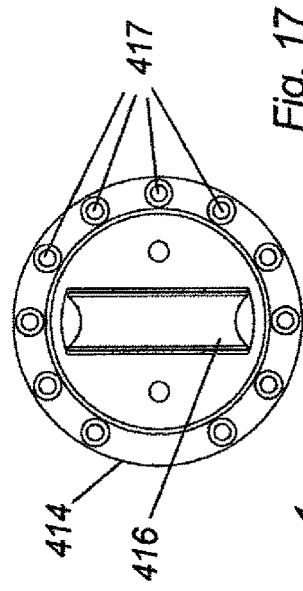
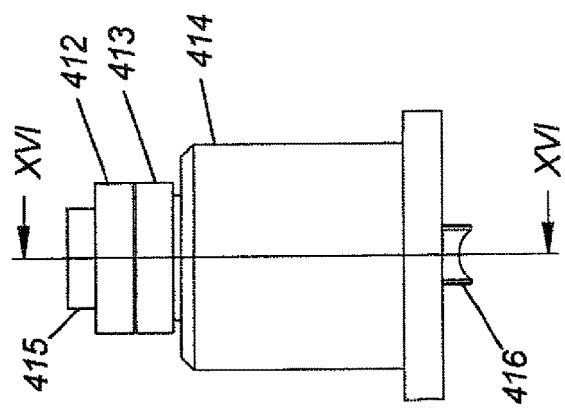
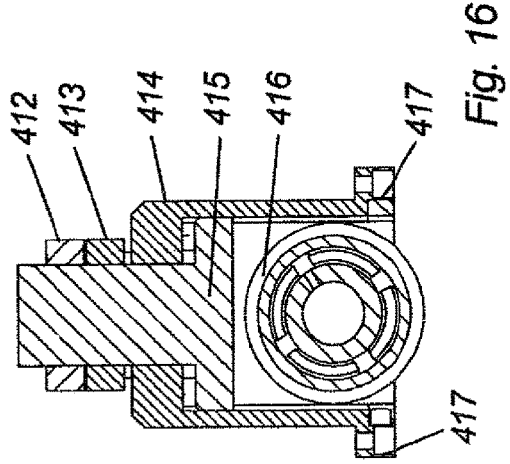

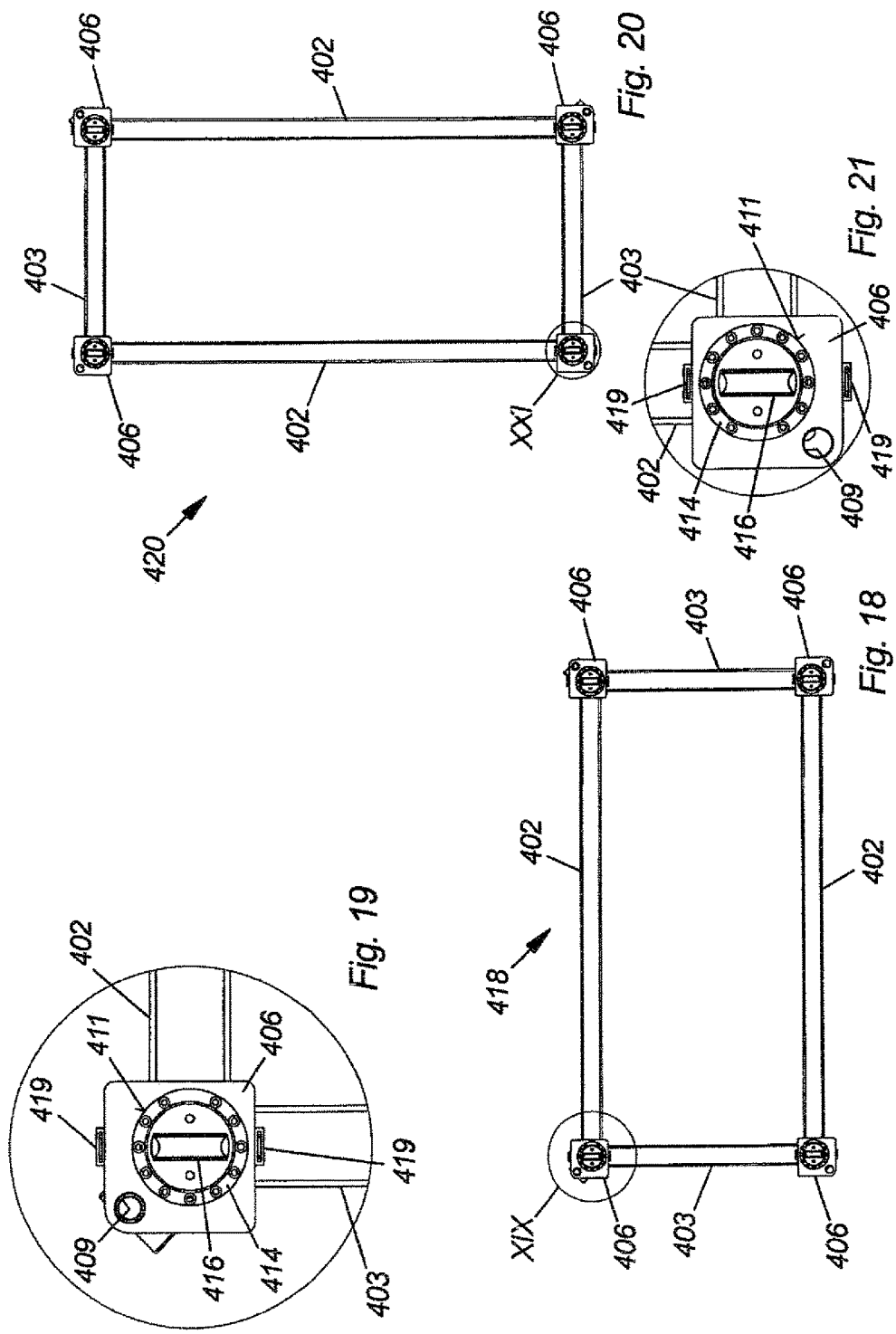

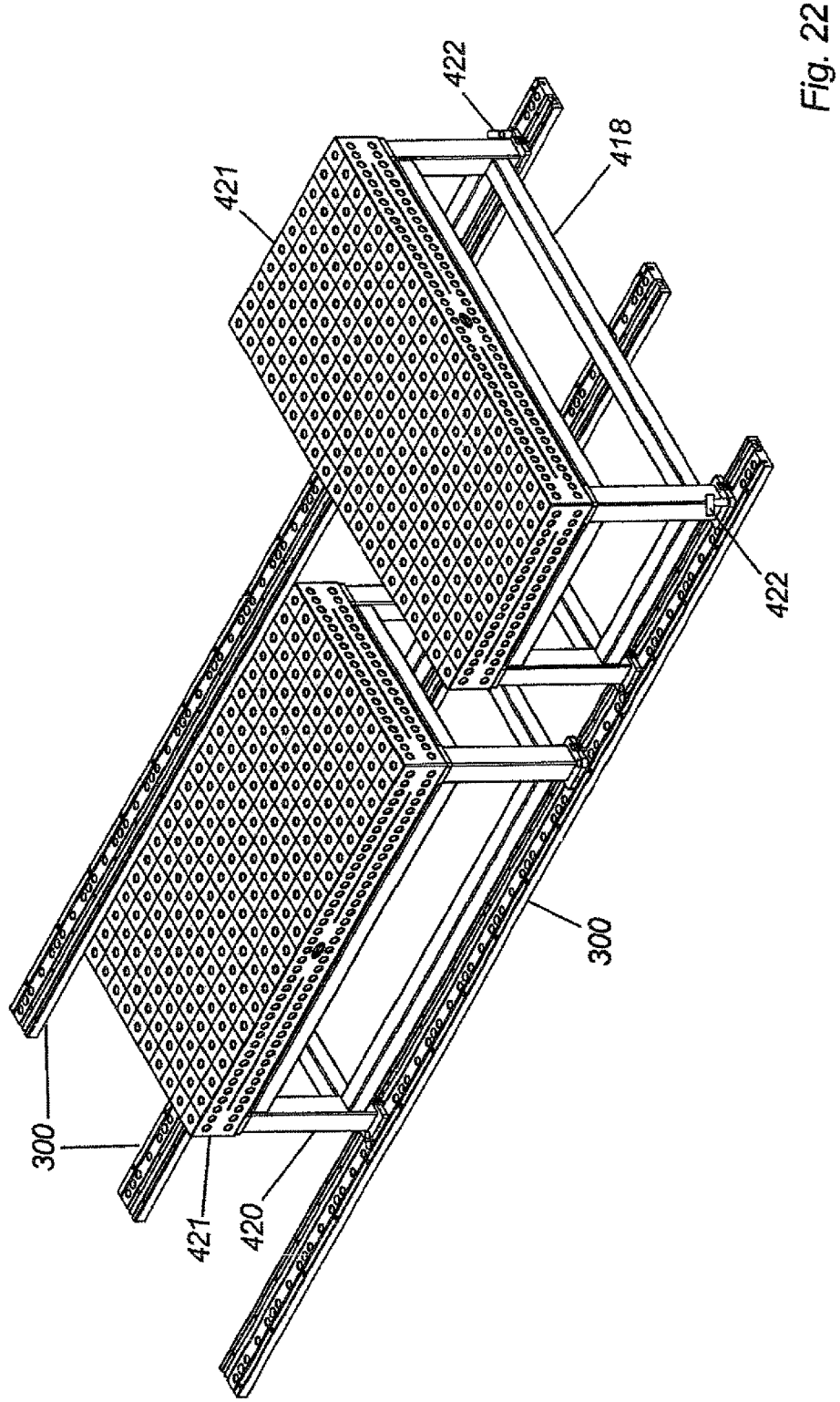

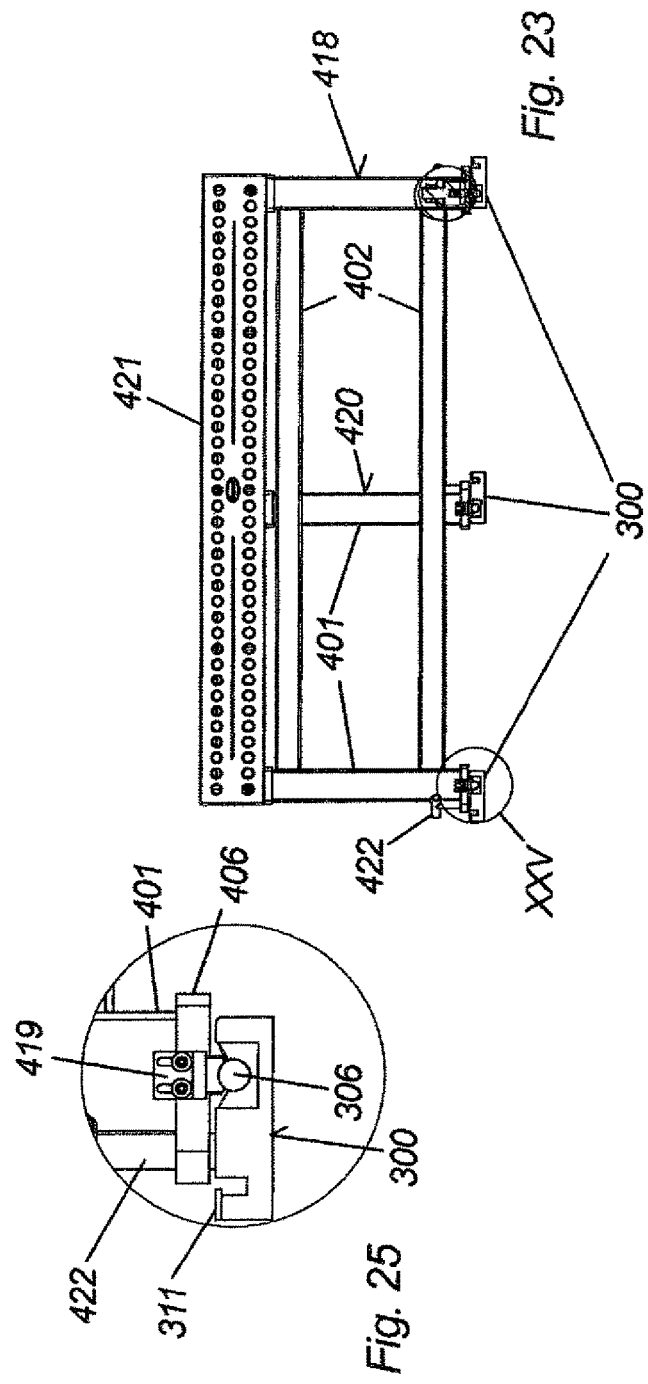

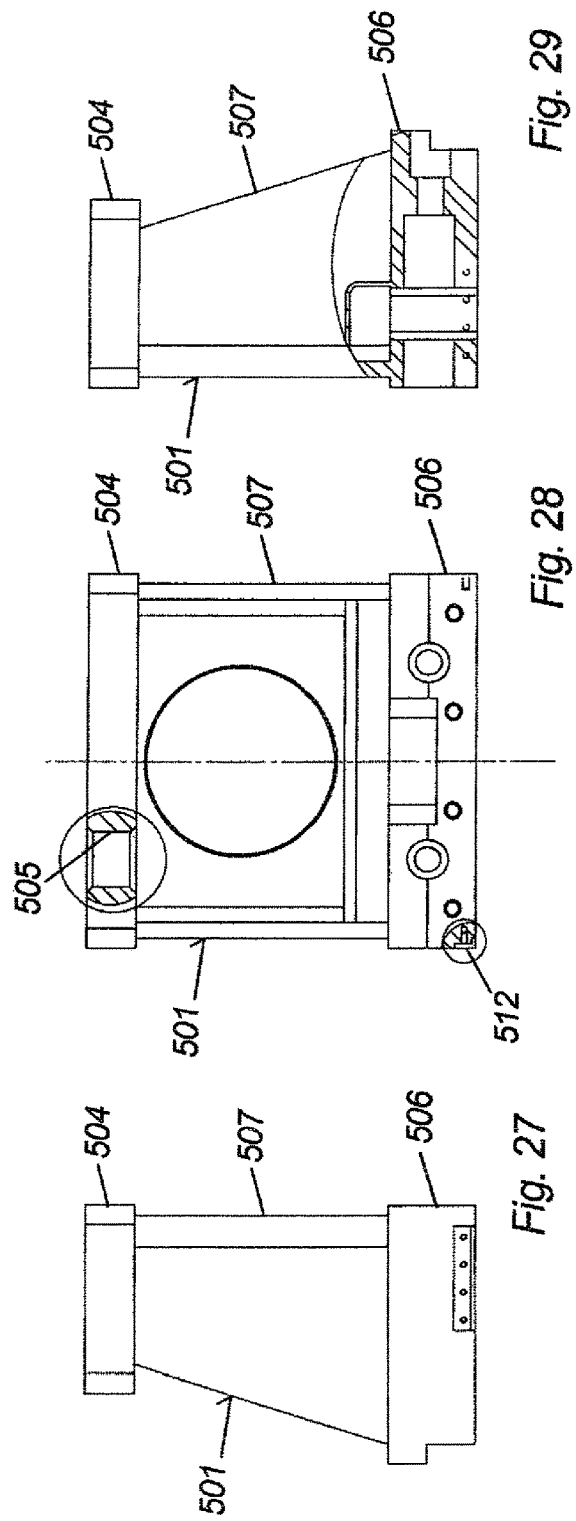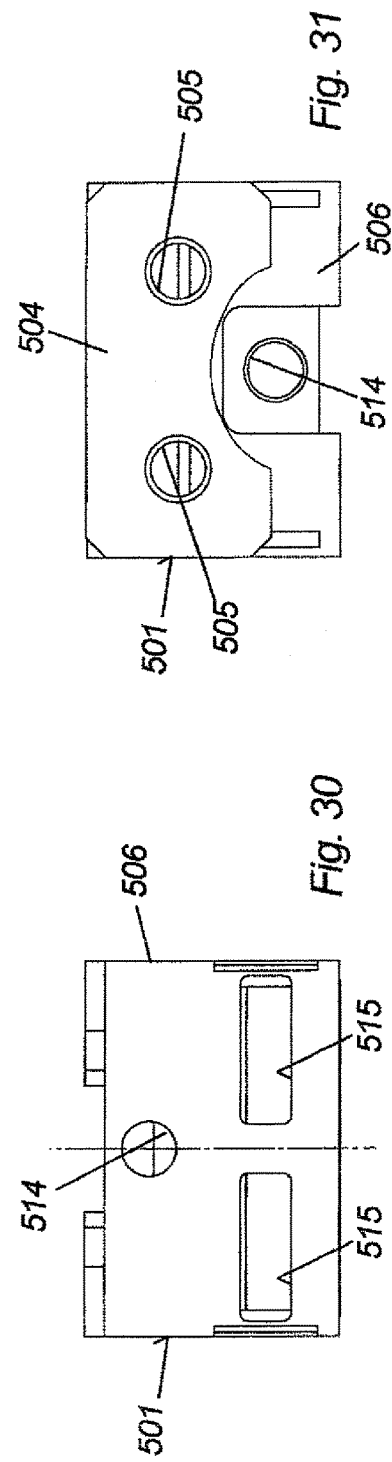

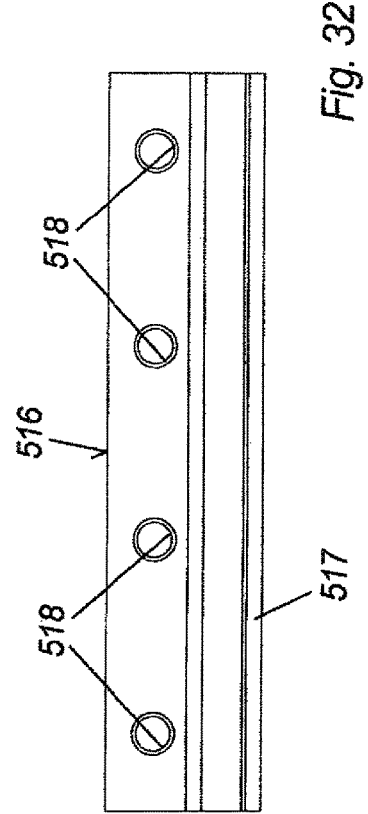
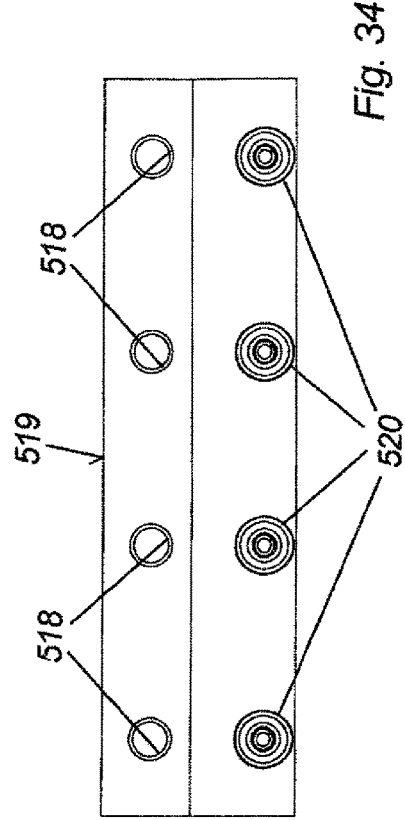
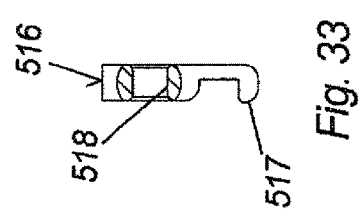
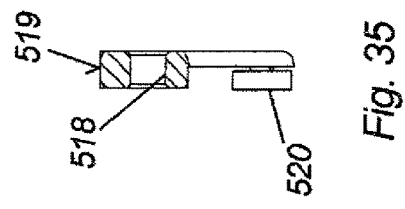

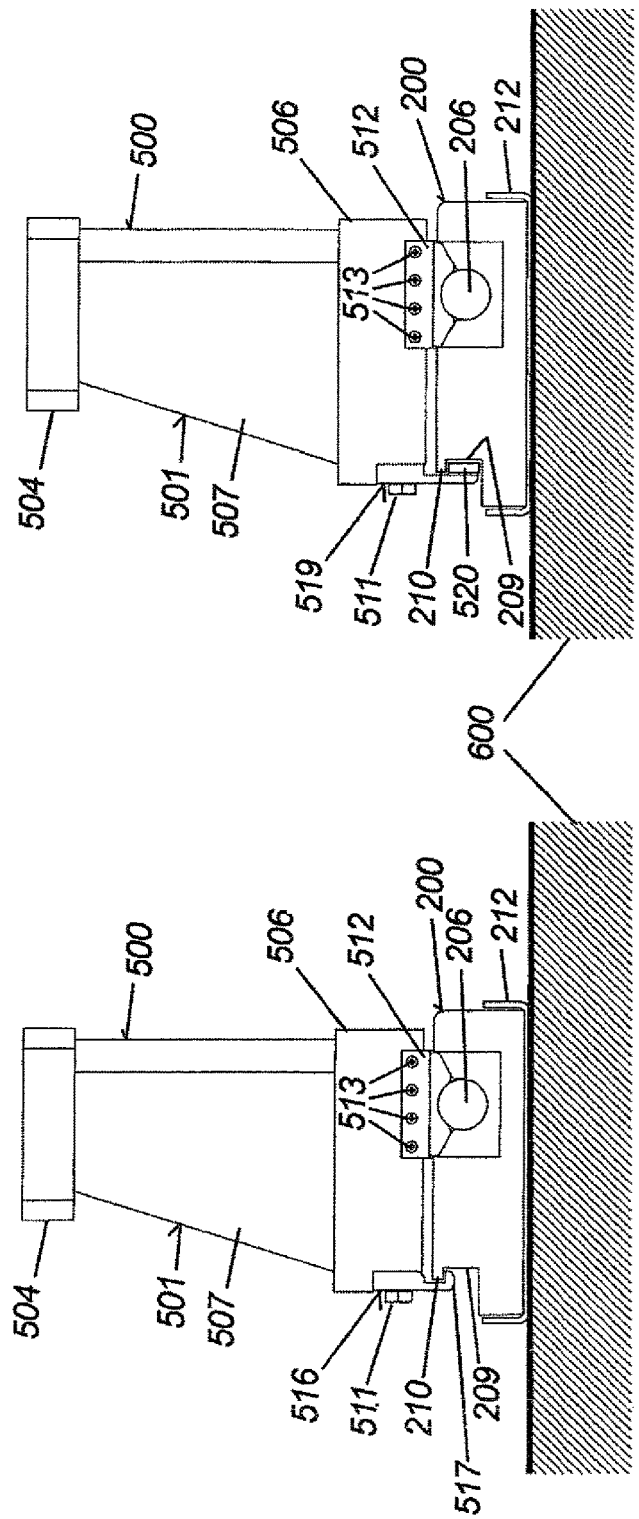

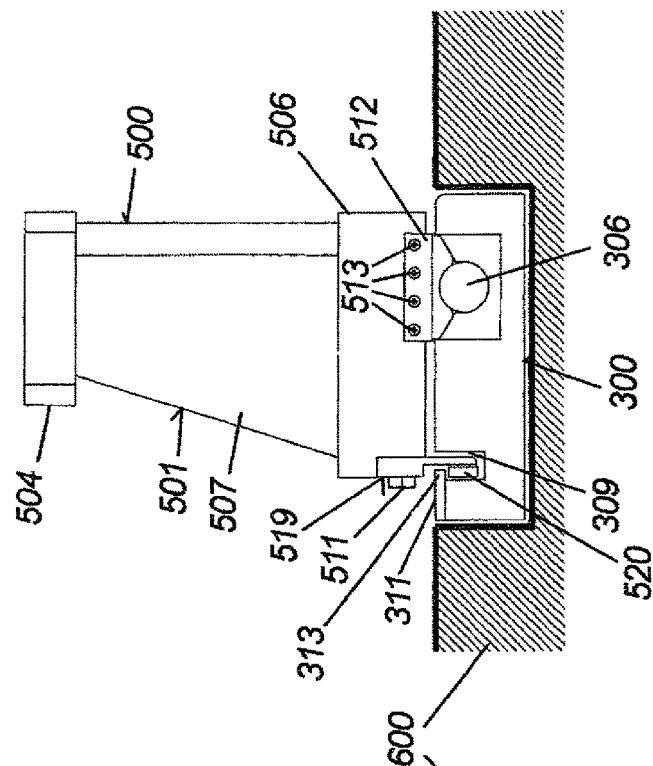
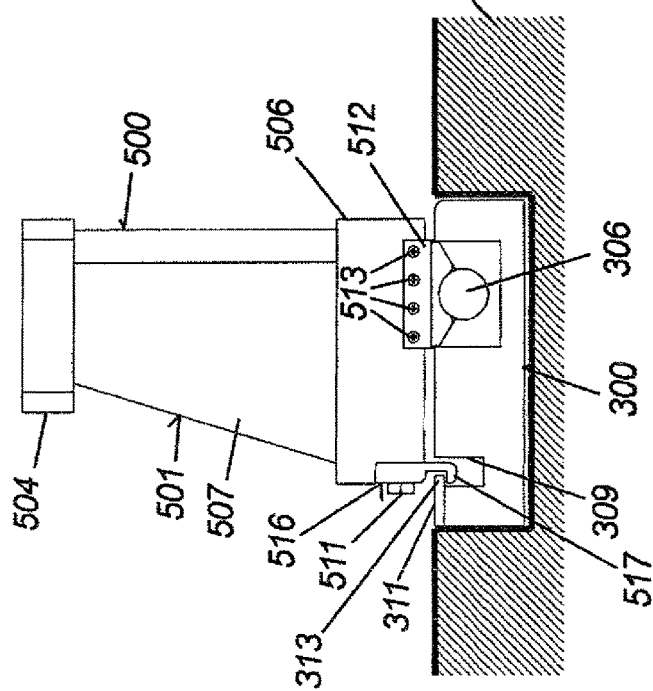

RAIL, CONNECTING FRAME, AND CASTER OF A RAIL SYSTEM FOR WELDING TABLES

CROSS-REFERENCES TO RELATED APPLICATIONS

This application is the U.S. National Stage of International Application No. PCT/EP2014/001918, filed Jul. 12, 2014, which designated the United States and has been published as International Publication No. WO 2015/028109 and which claims the priority of German Patent Application, Serial No. 20 2013 007 619.4, filed Aug. 28, 2013, pursuant to 35 U.S.C. 119(a)-(d).

BACKGROUND OF THE INVENTION

The invention relates to a rail of a rail system for welding tables including a base rail, which is configured for fastening on or in a floor and has multiple openings which correspond to the openings of the welding tables, a connecting frame of a rail system for welding tables, which is provided with rollers configured for interaction with a round rail, a caster of a rail system for welding tables, which includes a base body, rollers and a tilt protection device, and a rail system for welding tables.

In the state of the art, support rails and base rails are known in connection with welding tables, which support rails and base rails are configured for fastening on or in a floor and have multiple openings, which correspond to the openings of the welding tables. These are suited to construct a large-area grid for working on large components. The support- and base rails are fixedly screwed on the ground or if possible inserted in the hall floor. This results in a structured workspace with many clamping possibilities and thus enables safe, accurate and efficient working. On the support- and base rails connecting frames can be arranged in any desired position, which can be combined with table plates of welding tables.

In addition round rails are known in connection with welding tables, which are inserted into the concrete floor. On the fixedly installed round rails connecting frames can be positioned in a fast and step-less manner with precision rollers.

In addition shifting feet are known in connection with welding tables, which have a base body, rollers and a tilt protection device and are shiftable on support- and base rails. The rollers are hereby spring supported so that the shifting foot can only be shifted in the when not under load. The tilt protection is formed by a trapezoid sheet metal piece that far protrudes over the actual shifting foot in shifting direction, and which in praxis poses the risk of stumbling.

Such rails, connecting frames, roller feet and rail systems are used for example in connection with welding tables with which objects can be clamped and welded or otherwise processed. Besides this also there are also many other applications for welding tables, for example for measuring of devices or the like. Such welding tables are for example known from EP 0 541 904 A1 or DE 91 09 540 U1. The subject matter disclosed in these references is herewith incorporated by reference into the present application.

Welding tables are provided in their surface and optionally also in their lateral flanks of the table plate with multiple mostly round openings, which are arranged in an even grid spacing. The table plates can hereby be detachably connected with the corresponding table legs so that the table plates can also be connected with connecting frames or casters. For this purpose the table plates also have corresponding openings in the bottom region. Beside this the welding tables have various accessories to enable the clamping of objects. For example substantially angular supports are provided, which also have round openings or oblong openings. These supports can be connected with each other or with the table with clamping means, for example fastening bolts, which may consist of a threaded screw with associated nut. In addition fastening bolts are also used, which are inserted from one side into the openings of the table and are supported within the opening or on a bottom side of the table plate. Beside the mentioned references such fastening bolts are also known from DE 199 17 209 A1, DE 202 19 317 U1, the subject matter of which is herewith incorporated by reference into the present application.

Besides this clamping means are used in connection with welding tables, which also serve for clamping of objects. In addition to the mentioned references such clamps are also disclosed in U.S. Pat. No. 4,867,427, DE 100 11 490 A1; DE 200 23 552 U1, DE 202 04 107 U1, DE 202 12 731 U1, DE 202 19 317 U1, DE 10 2009 022 013 A1 or in the form of quick-release clamps. The subject matter of these references is herewith incorporated by reference into the present application.

Further accessories are various U-angles, stops with round and/or oblong openings and prisms.

SUMMARY OF THE INVENTION

The invention is based on the object to advantageously improve the state of the art.

This object is solved with the features of the independent claims. Advantageous embodiments of the invention are set forth in the dependent claims.

In the rail according to the invention for a rail system for welding tables including a base rail which is configured for fastening on or in a floor and has multiple openings corresponding to the openings of the welding tables, it is provided that a round rail is fastened in a recess of the base rail. The rail thus represents a combination of a support- and base rail with a round rail, which on one hand simplifies the mounting of a rail system made of at least one rail and on the other hand renders the rail more versatile. The rail can be installed in one step, thus saving time and also ensuring a higher accuracy when leveling the rails regarding their height and parallel orientation. The rail is oriented by means of threaded bolts and is subsequently fixedly screwed to the floor with floor anchors and screws. As support for the threaded bolts bearing plates are used. The rail can be mounted above ground or below ground, wherein during the mounting above ground usually bearing plates are placed underneath the rail.

In an embodiment of the rail the rail has a tilt protection recess, which includes a tilt protection edge and is configured for interacting with a tilt protection device of a caster.

In a first variant of the rail with tilt protection the tilt protection recess is arranged in a longitudinal side of the rail and the tilt protection edge is formed by a protrusion of the topside of the rail. This variant of the rail is particularly suited for fastening on a floor.

In the second variant of the rail with tilt protection the tilt protection recess is arranged in the topside of the rail and the tilt protection edge is formed by a tilt protection strip, which is detachably fastened to the rail and which partially covers the tilt protection recess. This variant of the rail is particularly suited for fastening in a floor, however, it can also be fastened on a floor.

In the connecting frame according to the invention of a rail system for welding tables, which is provided with rollers, which are configured for interaction with a round rail, a respective recess is provided in footplates of the connecting frame in which a rotating assembly roller can be fastened in different rotational positions. The connecting frame usually includes four legs, which are interconnected with transverse struts and have footplates and head plates for connection with the table plate the connecting frame can be shifted continuously in the round rails of a rail system made of at least two rails. When multiple rails are present at different distances so as to match the dimensions of the connecting frame, the connecting frame can also be used in a rotated position by rotating the rotating assembly roller in the footplates.

According to an embodiment of the connecting frame it is provided that in each of the footplates a respective opening is provided, which corresponds to the openings of the rail or welding tables, which enables fixation of the connecting frame on the rail by means of a brake rod at discrete positions.

Advantageously wipe-off brushes can be fastened on the sides of the footplates. The wipe off brushes are fastened on the footplates in accordance with the rotational position of the rotating assembly rollers in order to protect the rollers against dust or the like on the round rails.

In the caster according to the invention of a rail system for welding tables, which has a base body, rollers and a tilt protection device it is provided that the rollers are configured for interaction with a round rail and the tilt protection device is configured for interaction with a tilt protection recess and a tilt protection edge of a rail. The caster can thus be rolled on the round rail of a rail according to the invention with tilt protection recess and tilt protection edge in the when not under load and also when under load. The tilt protection device can hereby be arranged laterally on the base body so that no dangerous stumbling edge exists.

In a first variant of the caster, the tilt protection device includes a tilt protection hook.

In the second variant of the caster, the tilt protection device includes tilt protection rollers.

In the two variants of the caster it is advantageous when the tilt protection device includes a tilt protection strip on which the tilt protection hook or the tilt protection rollers are arranged and which is detachably fastened on the base body. Hereby it is particularly advantageous when the tilt protection rail can be fastened on the base body at two different positions. With this the caster can be used with the two variants of the rail with tilt protection by fastening the tilt protection strip on the base body in the position that respectively corresponds to the variant of the rail. In the first variant of the rail with tilt protection the tilt protection strip is fastened on the base body after placing the caster onto the rail. in the second variant of the rail with tilt protection the tilt protection strip is first removed from the rail, the caster is attached to the rail without tilt protection strip and the tilt protection strip is then fastened on the base body, before the tilt protection strip is then fastened on the rail.

According to an embodiment of the caster it is provided that an opening is provided in the foot plate of the base body which opening corresponds to the openings of the rail or welding tables, which enables fixation of the caster on the rail by means of a fastening bolt at discrete positions.

Advantageously wipe-off brushes can be provided on two opposing sides of the foot plate in order to protect the rollers against dust or the like on the round rails.

The rails, connecting frames and casters according to the invention result in rail systems, which either include at least one rail and at least one connecting frame or at least one rail and at least one caster, wherein the latter may also additionally include at least one connecting frame.

BRIEF DESCRIPTION OF THE DRAWING.

The invention is explained in more detail by way of the drawing. It is shown in:
FIG. 1 a rail,
FIG. 2 an enlarged view of the section II-II of FIG. 1,
FIG. 3 an enlarged view of the section III-III of FIG. 1,
FIG. 4 a first variant of a rail with tilt protection,
FIG. 5 an enlarged view of the section V-V of FIG. 4,
FIG. 6 an enlarged view of the section VI-VI of FIG. 4,
FIG. 7 a second variant of a rail with tilt protection,
FIG. 8 a tilt protection strip
FIG. 9 an enlarged view of the section IX-IX of FIG. 7,
FIG. 10 an enlarged view of the section X-X of FIG. 7,
FIGS. 11 to 13 a connection frame,
FIG. 14 an enlarged view of a detail of FIG. 13,
FIG. 15 a rotating assembly roller,
FIG. 16 a section along the line XVI-XVI of FIG. 15,
FIG. 17 a bottom view of the rotating assembly roller,
FIG. 18 a bottom view of the connecting frame,
FIG. 19 an enlarged view of the details XIX of FIG. 18,
FIG. 20 a bottom view of the connecting frame with rotated rotating assembly roller,
FIG. 21 an enlarged view of the detail XXI of FIG. 20,
FIGS. 22 to 24 different view of connecting frames with table plates on rails,
FIG. 25 an enlarged view of the details XXV of FIG. 23,
FIG. 26 an exploded view of a caster,
FIGS. 27 to 31 different views of the base body of the caster,
FIGS. 32 and 33 different views of a tilt protection strip with tilt protection hook of the caster,
FIGS. 34 and 35 different views of a tilt protection strip with tilt protection rollers of the caster,
FIGS. 36 and 37 a caster with tilt protection hook or tilt protection rollers in connection with the first variant of the rail with tilt protection,
FIGS. 38 and 39 a caster with tilt protection hook or tilt protection rollers in connection with a second variant of the rail with tilt protection,
FIGS. 40 and 41 different views of a connecting frame with table plate and casters with U-angle on a first variant of the rails with tilt protection,
FIGS. 42 and 43 different views of a connecting frame with table plate and roller feet with U-angle on a second variant of the rails with tilt protection.

Figure 24:
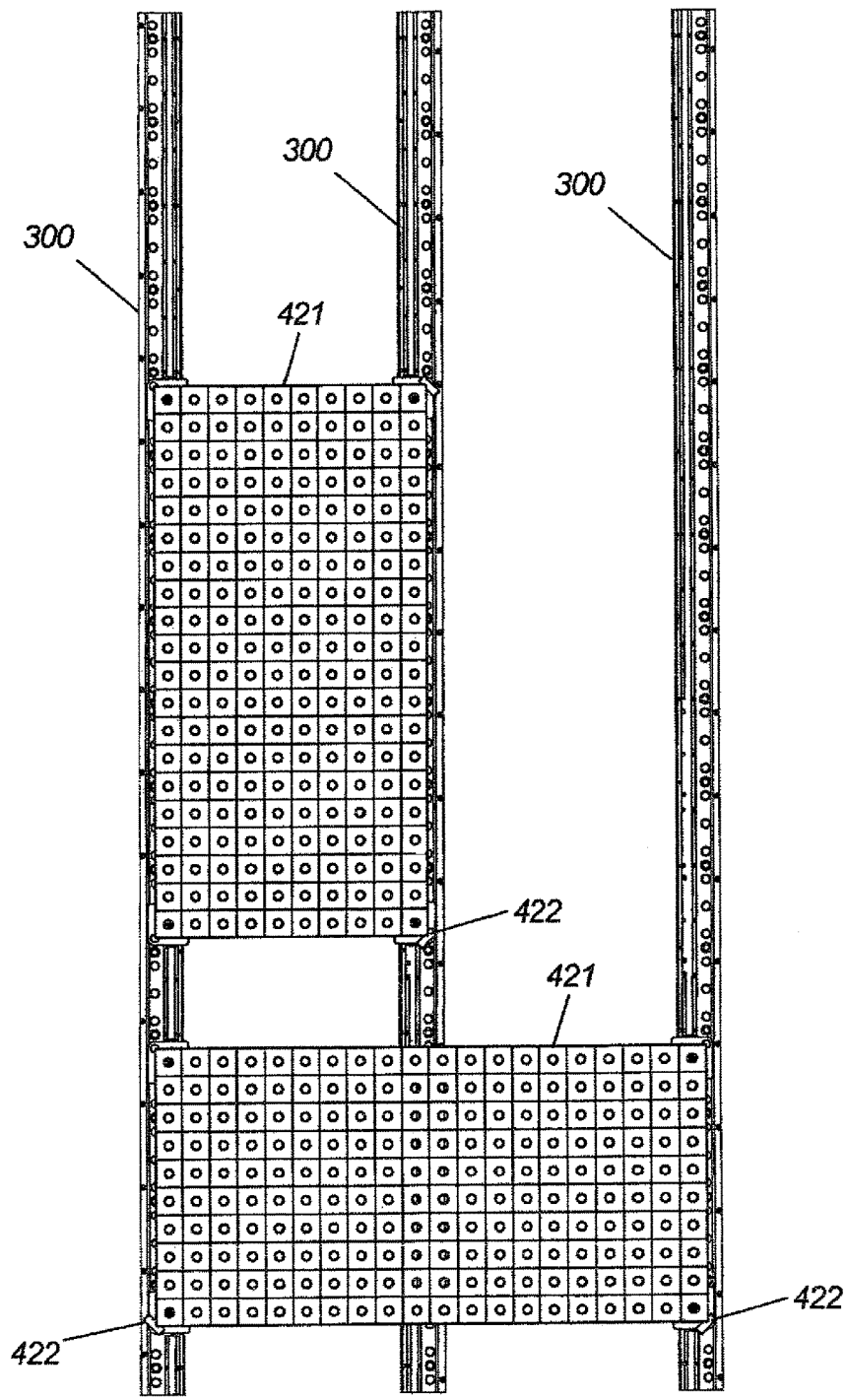

DETAILED DESCRIPTION OF PREFERRED EMBODIMENTS.

FIGS. 1 to 3 show a rail 100, which includes a base rail 101. The base rail 101 is configured for fastening on or in a floor, by virtue of having threaded holes 102 for fixing the rail 100 with threaded bolts and countersunk holes 102 for anchoring the rail 100 with screws in floor anchors. In addition the base rail 101 has multiple openings 104, which correspond to the openings of welding tables with which the rail 100 is used.

In a recess 105 of the base rail 101 a round rail 106 is fastened for example with screws 107.

FIGS. 4 to 6 show a first variant of a rail 200 with tilt protection, which includes a base rail 201. The base rail 201 is configured for fastening on a floor by virtue of having threaded holes 202 for fixing the rail 200 with threaded bolts and countersunk holes 203 for anchoring the rail 200 with screws in floor anchors. Hereby usually bearing plates are placed underneath the rail 200. In addition the base rail 201 has multiple openings 204, which correspond to the openings of welding tables with which the rail 200 is used.

In a recess 205 of the base rail a round rail 206 is fastened for example with screws 207.

In a longitudinal side 208 of the rail 200 a tilt protection recess 209 is arranged which includes a tilt protection edge 210. The tilt protection edge 210 is hereby formed by a protrusion of the topside 211 of the rail 200 and is configured for interaction with a tilt protection device of a caster as explained further below.

FIGS. 7 to 10 show a second variant of a rail 300 with tilt protection, which includes a base rail 301. The base rail 301 is configured for fastening on or in a floor by virtue of having threaded holes 302 for fixing the rail 300 with threaded bolts and countersunk holes 303 for anchoring the rail 300 with screws in floor anchors. Hereby, when mounting above ground usually bearing plates are placed underneath the rail 300. In addition the base rail 301 has multiple openings 304, which correspond to the openings of the welding tables with which the rail 300 is used.

In a recess 305 of the base rail 301 a round rail 306 is fastened for example with screws 307.

In the topside 308 of the rail 300 a tilt protection recess 309 is arranged. In the threaded bores 310 a tilt protection strip 311 with countersunk holes 312 on the rail 300 can be detachably fastened. As in particular shown in FIGS. 9 and 10, the fastened tilt protection strip 311 partially covers the tilt protection recess 309 and thus forms a tilt protection edge 313. The tilt protection edge 313 is configured for interaction with a tilt protection device of a caster, as explained below.

FIGS. 11 to 14 show a connecting frame 400, which has four legs 401 that are interconnected with long transverse struts 402 and short transverse struts 403. The legs 401, the long transverse struts 402 and the short transverse struts 403 are constructed as square tubes, wherein any other configuration is also conceivable without departing from the scope of the invention.

The legs 401 are provided with head plates 404, which have openings 405 which correspond to the openings of welding tables with which the connecting frames 400 are used. With this it is possible to connect table plates of the welding tables with the connecting frames 400.

The legs 401 are additionally provided with footplates 406 in which round recesses 407 with circumferential threaded bores 408 are provided in which a rotating assembly roller, which is described below, can be fastened in different rotational positions.

In the footplates 406 a respective opening 409 is provided, which correspond to the openings 104, 204, or 304 of the rails 100, 200 or 300 or of welding tables with which the connecting frame 400 is used. With this the connecting frame 400 is fixable on the rail 100, 200 or 300 by means of a brake rod at discrete positions as explained below.

In addition threaded bores 410 are present on the sides of the footplates 406 in which wipe-off brushes can be fastened as explained in more detail below.

FIGS. 15 to 17 show a rotating assembly roller 411 for the connecting frame 400. The rotating assembly roller 411 includes two bearings 412, 413 in which an outer sleeve 414 and a guide 415 are supported. In the guide 415 the actual roller 416 is located, which is configured for interaction with a round rail 106, 206 or 306.

The outer sleeve 414 has countersunk holes 417 which extend about the roller, which countersunk holes correspond to the circumferential threaded bores 408 of the footplates 406 so that the rotating assembly roller 411 can be fastened in the recesses 407 in different rotational positions.

FIG. 18 shows a bottom view of a connecting frame 418 with rotating assembly roller 411. As in particular shown in the detail view of FIG. 19, the rotating assembly roller 411 is fastened on the foot plate 406 so that the running direction of the roller 416 is oriented in the direction of the short transverse strut. The connecting frame 418 can thus be shifted on a round rail 106, 206 or 306, which extends parallel to the short transverse struts 403. In the running direction of the roller 416, wipe-off brushes 419 are fastened on the footplates 406 in order to protect the rollers 416 against dust or the like on the round rails 106, 206 or 306.

FIG. 20 shows a bottom view of a connecting frame 420 with rotating assembly rollers 411, which are rotated by 90° relative to the connecting frame 418. As particularly shown in the detail view of FIG. 21, the rotating assembly roller 411 is fastened on the foot plate 406 so that the running direction of the roller 416 is oriented in the direction of the long transverse struts 402. The connecting frame 420 can thus be shifted on the round rail 106, 206 or 306, which extends parallel to the long transverse struts 402. In the running direction of the roller 416, wipe-off brushes 419 are fastened on the footplates 406 in order to protect the rollers 416 against dust or the like on the round rails 106, 206 or 306.

FIGS. 22 to 24 show a rail system including connecting frames 418, 420 with table plates 421 on three parallel extending rails 300. The table plates 421 are provided with openings in their surface and in lateral flanks as is known, and are connected with the connecting frames 418, 420. Instead of the rails 300 also rails 100 or 200 can be used.

In particular the detail view of FIG. 25 shows that the rollers 416 situated behind the wipe off brushes 419 run on the round rail 306.

The position of the connecting frames 418, 420 on the rails 300 can be fixed by means of brake rods 422 at discrete positions, in that the brake rods 422 engage through the openings 409 into the openings 304. Instead of brake rods 422 fastening bolts of the welding tables can also be used.

Figure 26:
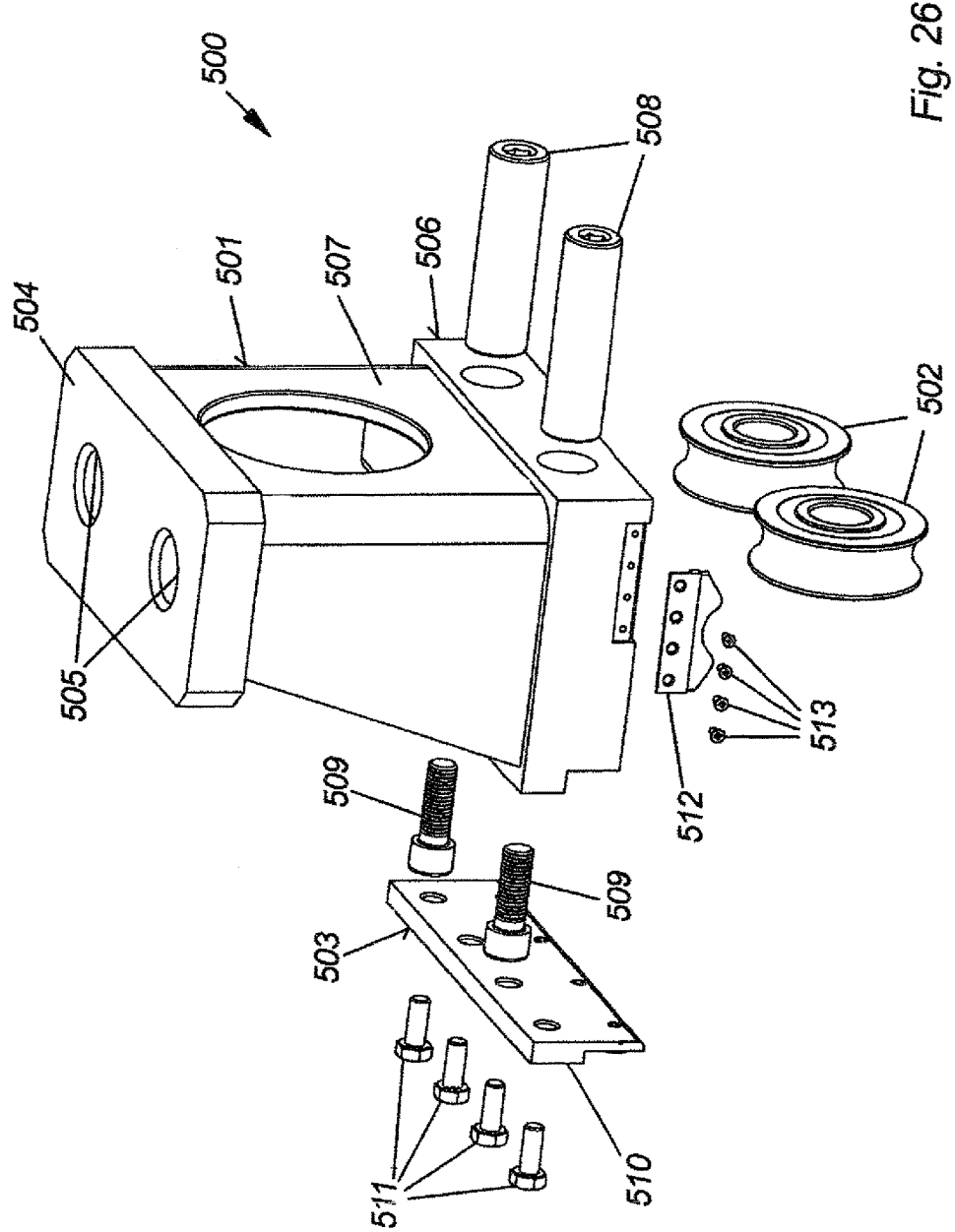

FIG. 26 shows an exploded view of a caster 500, which includes a base body 501, rollers 502 and a tilt protection device 503. The rollers 502 are configured for interaction with a round rail 206, 306 and the tilt protection device 503 for interaction with a tilt protection recess 209, 300 and tilt protection edge 210, 313 of a rail 200, 300. The caster can thus be rolled on the round rail 206, 306 of a rail 200, 300.

As particularly clearly shown in the view of FIGS. 27 to 31, the base body 501 has a head plate 504, which has openings 505 which correspond to the openings of welding tables with which the caster 500 is used. With this it is possible to connect table plates or U-angles of the welding tables with the caster 500.

The base body 501 also has a foot plate 506, with U-shaped walls 507 being situated between the head plate 504 and the foot plate 506.

In the foot plate 506 axles 508 with cylinder screws 509 for the rollers 502 are supported. The tilt protection device 503 includes a tilt protection strip 510 whose variants are explained in more detail below and which can be detachably fastened with hexagon screws 511 in the base body, wherein the tilt protection strip 510 can be fastened in two positions.

It is understood that the tilt protection device may also alternatively be connected with the base body 501. Wipe off brushes 512 can be fastened with countersunk screws 513 in two opposing sides of the foot plate 506.

In the foot plate 506 an opening 514 is provided, which corresponds to the openings 204 or 304 of rails 200 or 300 or to welding tables with which the caster 500 is used. With this the caster 500 can be fixed on the rail 200 or 300 by means of a brake rod or a clamping bolt of the welding tables at discrete positions as explained in more detail below. Of course also recesses 515 for the rollers 502 are present in the foot plate 506.

The first variant of a tilt protection strip 516 shown in FIGS. 32 and 33 includes a tilt protection hook 517, which is configured for interaction with the tilt protection recess 209, 309 and tilt protection edge 210, 313 of the rail 200, 300. Bores 518 serve for fastening the tilt protection strip 516 on the base body 501 by means of the hexagon screws 511. Hereby the tilt protection strip 516 can be fastened in the position shown in FIG. 33 as well as mirror inverted relative thereto on the base body 501 so that the caster 500 can be used together with the rail 300 as well as with the rail 200.

The second variant of a tilt protection strip 529 shown in FIGS. 34 and 35 includes tilt protection rollers 520, which are configured for interaction with the tilt protection recess 209, 309 and tilt protection edge 210, 313 of the rail 200, 300. Bores 518 serve for fastening the tilt protection strip 519 on the base body 501 by means of the hexagon screws 511. Hereby the tilt protection strip 519 can be fastened in the position shown in FIG. 35 as well as mirror inverted thereto on the base body 501 so that the caster 500 can be used together with the rail 300 as well as with the rail 200.

The different possible combinations of rails 200, 300 and tilt protection strips 516, 519 on the caster 500 are particularly well shown in FIGS. 36 to 39.

FIGS. 36 and 37 show a respective rail 200, which is fastened above ground on a floor 600 by using bearing plates 212. On the rails 200 a caster 500 is present, wherein the rollers 502 located behind the wipe-off brushes 512 run on the round rails 206. The tilt protection strips 516, 519 engage with their tilt protection hooks 517 or tilt protection rollers 520 about the tilt protection edge 210 into the tilt protection recess 209 so that a tilting of the caster 500 in the rail 200 is excluded.

In this variant the tilt protection strip 516, 519 is fastened on the base body 501 after placing the caster 500 on the rail 200.

FIGS. 38 and 39 each show a rail 300, which is fastened below ground in a floor 600. A caster 500 is present on the rails 300, wherein the rollers 502 located behind the wipe-off brushes 512 run on the round rails 306. The tilt protection strips 516, 519 engage with their tilt protection hooks 517 or tilt protection rollers 520 about the tilt protection edge 311 formed by the tilt protection strip 311 into the tilt protection recess 309 so that a tilting of the caster 500 n the rail 300 is excluded.

The tilt protection strip 311 is in this variant first removed from the rail 300, the caster 500 is placed onto the rail 300 without tilt protection strip 516, 519 and the tilt protection strip 516, 519 is then fastened on the base body 501 before the tilt protection strip 311 is finally fastened in the rail 300 again.

Figure 41:
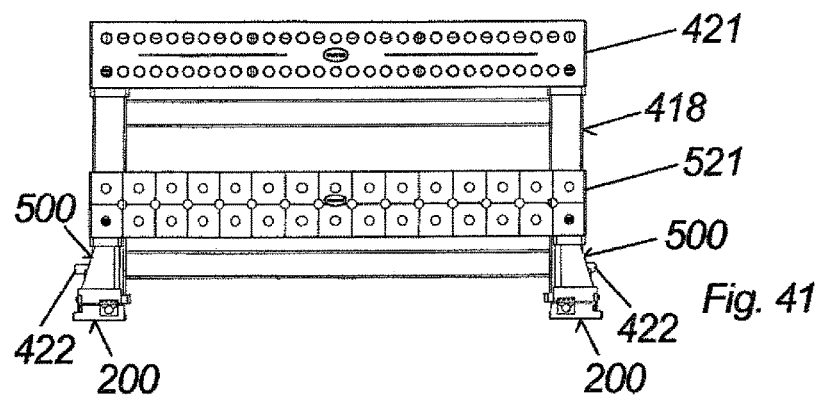
Figure 40:
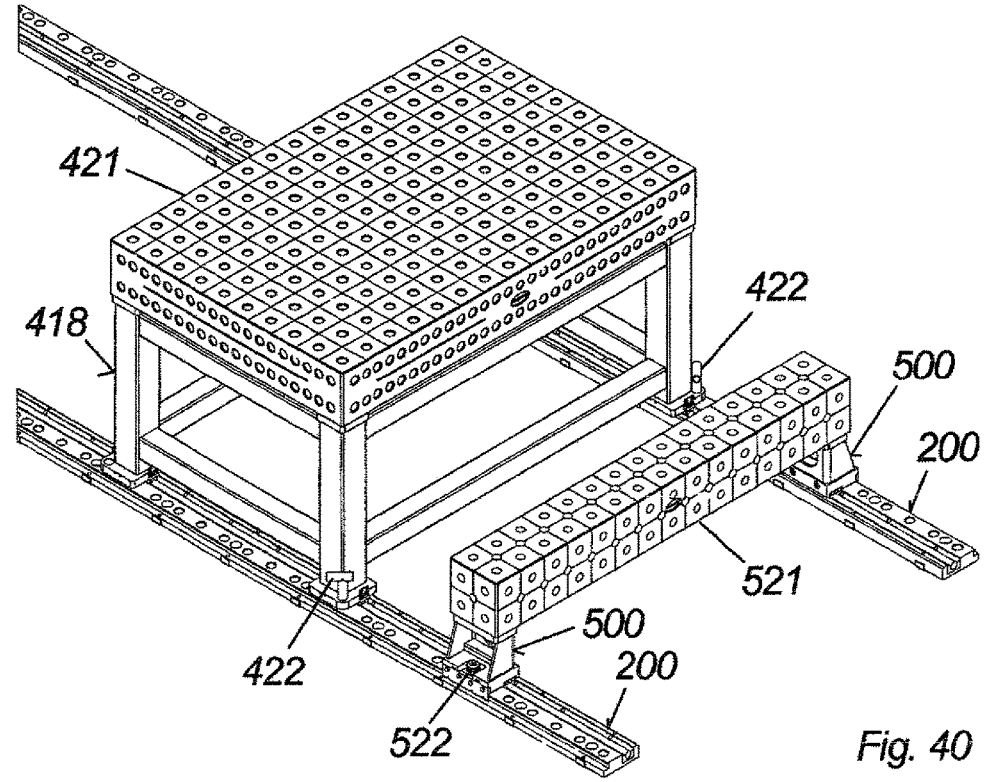

FIGS. 40 and 41 show a rail system including a connecting frame 418 with table plate 421 and roller feet 500 with U-angle 521 on two parallel extending rails 200. The position of the connecting frame 418 on the rails 200 is fixable by means of brake rods 422 at discrete positions, in that the brake rods 422 engage through the openings 409 into the openings 204. The position of the casters 500 on the rails 200 is fixable by means of fastening bolts 522 at discrete positions, in that the fastening bolts 522 engage through the openings 514 into the openings 204.

Figure 43:
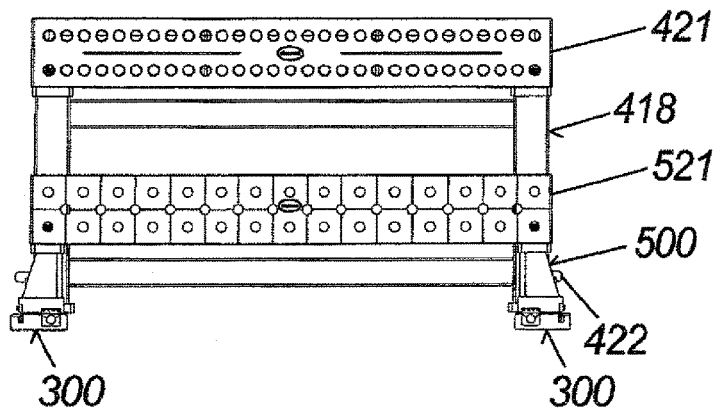
Figure 42:
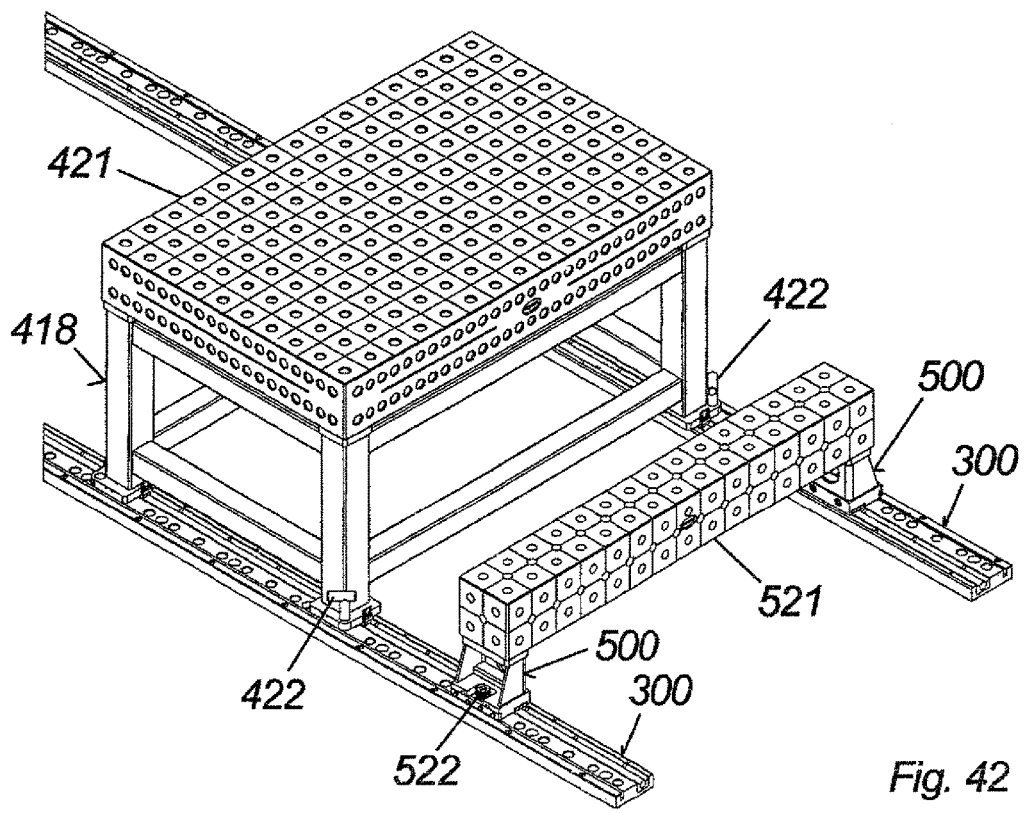

FIGS. 42 and 43 show a rail system including a connecting frame 418 with table plate 421 and roller feet 500 with U-angle 521 on two parallel extending rails 300. The position of the connecting frame 418 on the rails 300 can be fixed by means of brake rods 422 at discrete positions, in that the brake rods 422 engage through the openings 409 into the openings 304. The position of the casters 500 on the rails 300 can be fixed by means of fastening bolts 522 at discrete positions in that the fastening bolts 522 engage through the openings 514 into the openings 304.

Brake rods 422 and fastening bolts 522 can alternatively also be used for a caster 500 or connecting frame 400, 418, 420 for fixation in the rails 100, 200, 300.

REFERENCE SIGNS 100 rail
101 base rail
102 threaded holes
103 countersunk holes
104 openings
105 recess
106 round rail
107 screws
200 rail
201 base rail
202 threaded holes
203 countersunk holes
204 openings
205 recess
206 round rail
207 screws
208 longitudinal side
209 tilt protection recess
210 tilt protection edge
211 topside
212 bearing plates
300 rail
301 base rail
302 threaded holes
303 countersunk holes
304 openings
305 recess
306 round rail
307 screws
308 topside
309 tilt protection recess
310 threaded bores
311 tilt protection strip
312 countersunk holes
313 tilt protection edge
400 connecting frame
401 leg
402 long transverse struts
403 short transverse struts
404 head plates
405 openings
406 footplates
407 recess
408 threaded bores for rotating assembly roller
409 opening 410 threaded bores for wipe off brushes
411 rotating assembly roller
412 bearing
413 bearing
414 outer sleeve
415 guide
416 roller
417 countersunk holes
418 connecting frame
419 wipe off brushes
420 connecting frame
421 table plates
422 brake rods
500 caster
501 base body
502 rollers
503 tilt protection device
504 head plate
505 openings
506 foot plate
507 U-shaped walls
508 axles
509 cylinder screws
510 tilt protection strip
511 hexagon screws
512 wipe-off brushes
513 hexagon screws
514 opening
515 recesses
516 tilt protection strip with hook
517 tilt protection hook
518 bores
519 tilt protection strip with rollers
520 tilt protection rollers
521 U-angle
522 fastening bolts
600 floor

What is claimed is:

1. A connecting frame of a rail system for welding tables, said connecting frame, comprising:
   foot plates, each said foot plates being provided with a recess;
   a rotating assembly roller received in the recess and fastenable in different rotational positions in the recess, said rotating assembly comprising a roller configured for interaction with a round rail,
   wherein the footplates are provided with a respective opening which corresponds to openings of a rail or to openings of the welding tables, said connecting frame being fixable at discrete positions on the rail by means of a brake rod.

2. A connecting frame of a rail system for welding tables, said connecting frame, comprising:
   foot plates, each said foot plates being provided with a recess;
   a rotating assembly roller received in the recess and fastenable in different rotational positions in the recess, said rotating assembly comprising a roller configured for interaction with a round rail; and
   wipe-off brushes fastenable in sides of the footplates.

3. A caster of a rail system for welding tables, said caster comprising:
   a base body, rollers and a tilt protection device, said rollers being configured for interaction with a round rail, said tilt protection device being configured for interaction with a tilt protection recess and with a tilt protection edge of a rail,
   wherein the tilt protection device comprises a tilt protection strip on which a tilt protection hook or tilt protection rollers are arranged and which is detachably fastened on the base body, wherein the base body has a foot plate, said foot plate being provided with an opening, which corresponds to openings of the rail or to openings of the welding tables, said caster being fixable on the rail at discrete positions by engagement of a fastening bolt through the opening of the foot plate into the openings of the rail.

4. A caster of a rail system for welding tables, said caster comprising:
   a base body, rollers and a tilt protection device, said rollers being configured for interaction with a round rail, said tilt protection device being configured for interaction with a tilt protection recess and with a tilt protection edge of a rail,
   wherein the tilt protection device comprises a tilt protection strip on which a tilt protection hook or tilt protection rollers are arranged and which is detachably fastened on the base body, further comprising wipe-off brushes provided on two opposing sides of the foot plate.

5. A rail system for welding tables, said rail system, comprising:
   at least one rail, said at least one rail comprising a base rail configured for fastening on or in a floor and having multiple openings, which correspond to openings of the welding tables, and further comprising a round rail fastened in a recess of the base rail and a tilt protection recess, which includes a tilt protection edge and is configured for interaction with a tilt protection device of a caster, said tilt protection recess being arranged in a topside of the rail, said tilt protection edge being formed by a tilt protection strip, which is detachably fastened to the rail and partially covers the tilt protection recess; and
   at least one connecting frame comprising foot plates, each said foot plates being provided with a recess, said at least one connecting frame further comprising a rotating assembly roller received in the recess and fastenable in different rotational positions in the recess, said rotating assembly comprising a roller configured for interaction with the round rail.

6. A rail system for welding tables comprising:
   at least one rail, said at least one rail comprising a base rail configured for fastening on or in a floor and having multiple openings, which correspond to openings of the welding tables, and further comprising a round rail fastened in a recess of the base rail and a tilt protection recess, which includes a tilt protection edge and is configured for interaction with a tilt protection device of a caster, said tilt protection recess being arranged in a topside of the rail, said tilt protection edge being formed by a tilt protection strip, which is detachably fastened to the rail and partially covers the tilt protection recess; and
   at least one caster comprising a base body, rollers and a tilt protection device, said rollers being configured for interaction with a round rail, said tilt protection device being configured for interaction with a tilt protection recess and with a tilt protection edge of the rail, wherein the tilt protection device comprises a tilt protection strip on which a tilt protection hook or tilt protection rollers are arranged and which is detachably fastened on the base body.

7. The rail system of claim 3, further comprising at least one connecting frame comprising foot plates, each said foot plates being provided with a recess; a rotating assembly roller received in the recess and fastenable in different rotational positions in the recess, said rotating assembly comprising a roller configured for interaction with a round rail.

8. The caster of claim 4, wherein the tilt protection strip is fastenable on the base body in two different positions.

9. The caster of claim 3, wherein the tilt protection strip is fastenable on the base body in two different positions.

* * * * *